United States Patent
Chen et al.

(10) Patent No.: US 10,291,116 B2
(45) Date of Patent: May 14, 2019

(54) OUTPUT CONTROL METHOD FOR A DIGITAL CONTROLLER OF A SOURCE MEASURE UNIT

(71) Applicant: CHROMA ATE INC., Taoyuan (TW)

(72) Inventors: Tsz-Lang Chen, Taoyuan (TW); Ming-Chieh Lin, Taoyuan (TW); Wen-Min Yang, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 0 days.

(21) Appl. No.: 15/674,278

(22) Filed: Aug. 10, 2017

(65) Prior Publication Data

US 2018/0048228 A1 Feb. 15, 2018

(30) Foreign Application Priority Data

Aug. 12, 2016 (TW) .............................. 105125796 A

(51) Int. Cl.
*G05F 1/10* (2006.01)
*H02M 3/10* (2006.01)
*H02M 1/08* (2006.01)
*G05F 1/00* (2006.01)
*H02M 1/00* (2006.01)

(52) U.S. Cl.
CPC .............. *H02M 3/10* (2013.01); *G05F 1/00* (2013.01); *H02M 1/08* (2013.01); *H02M 2001/0003* (2013.01)

(58) Field of Classification Search
CPC . H02M 3/10; H02M 3/156; H01L 2224/0401; H01L 2924/181; H01L 2924/014; G05F 1/62

USPC .............. 323/222, 224, 265, 266, 268, 280, 323/282–288; 324/76.11, 762.09
See application file for complete search history.

(56) References Cited

U.S. PATENT DOCUMENTS

| | | | | |
|---|---|---|---|---|
| 5,747,976 A | * | 5/1998 | Wong | H02M 3/156 323/282 |
| 6,194,883 B1 | * | 2/2001 | Shimamori | H02M 3/157 323/282 |
| 7,148,669 B2 | * | 12/2006 | Maksimovic | H02M 1/4225 323/283 |
| 7,580,272 B2 | * | 8/2009 | Taguchi | H02M 1/12 323/222 |

(Continued)

*Primary Examiner* — Rajnikant B Patel
(74) *Attorney, Agent, or Firm* — Hanley, Flight & Zimmerman, LLC

(57) ABSTRACT

An output control method for a controller includes the following steps. At each of detection time points, the controller detects a detection voltage value and a detection current value of a load. In a voltage control mode, the controller generates a setting parameter to control the power amplifier according to part of the detection voltage values. In a current control mode, the controller generates the setting parameter to control the power amplifier according to part of the detection current values. When the controller switches to the voltage control mode or the current control mode, the controller determines a ratio between the detection current value and the detection voltage value at one of the detection time points and the setting parameter is generated according to the ratio. Therefore, the bandwidth is substantially the same no matter if the controller operates in the voltage control mode or the current control mode.

8 Claims, 3 Drawing Sheets

(56) References Cited

U.S. PATENT DOCUMENTS

| | | | | |
|---|---|---|---|---|
| 7,923,980 B2* | 4/2011 | Takahashi | ............ | H02M 3/157 323/280 |
| 2005/0068796 A1* | 3/2005 | Morita | ................ | H02M 1/4225 363/120 |
| 2014/0139198 A1* | 5/2014 | Manlove | ............... | H02M 3/156 323/282 |

* cited by examiner

OUTPUT CONTROL METHOD FOR A DIGITAL CONTROLLER OF A SOURCE MEASURE UNIT

CROSS-REFERENCE TO RELATED APPLICATIONS

This non-provisional application claims priority under 35 U.S.C. § 119(a) on Patent Application No(s). 105125796 filed in Taiwan, R.O.C. on Aug. 12, 2016, the entire contents of which are hereby incorporated by reference.

TECHNICAL FIELD

The disclosure relates to an output control method for controllers, more particularly to an output control method for equalizing bandwidth in various feedback loops as a controller switches from a control mode to another control mode.

BACKGROUND

A source measure unit (SMU) can be programmed to power a developing device or a device under test. A conventional source measure unit can also monitor the voltage or current consumption of the developing device or device under test, and according to the voltage value or current value monitored, make an adjustment for the voltage or current to be supplied from the source measure unit. Therefore, the supplied voltage or current may fit the requirements of development or test, and the possibility of burning out the device may also decrease.

However, a conventional source measure unit usually adjusts the voltage or current to be supplied when it is monitored that the output voltage or current arrives a preset threshold; and this easily cause overshoot occurring to the supplied voltage or current. Moreover, when a conventional source measure unit switches its control loop, the output signal may have a disharmonious variation waveform, leading to the decrease of the reliability of power supply.

SUMMARY

According to one or more embodiment, an output control method is applied to a controller that is electrically connected to a load via a current feedback loop and a voltage feedback loop. The controller outputs a setting parameter to a power amplifier so that the power amplifier provides a driving signal to the load according to the setting parameter.

The output control method includes: at each of a plurality of detection time points, detecting a detection current value on the load by the current feedback loop and detecting a detection voltage value on the load by the voltage feedback loop; in a voltage control mode, generating the setting parameter according in part to the detection voltage values; in a current control mode, generating the setting parameter according in part to the detection current values; and at one of the plurality of detection time points by the controller, determining a ratio between the detection current value and the detection voltage value and generating, according to at least the ratio, the setting parameter for substantially equalizing bandwidth in the voltage feedback loop and the current feedback loop when the controller switches from the voltage control mode to the current control mode or from the current control mode to the voltage control mode.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
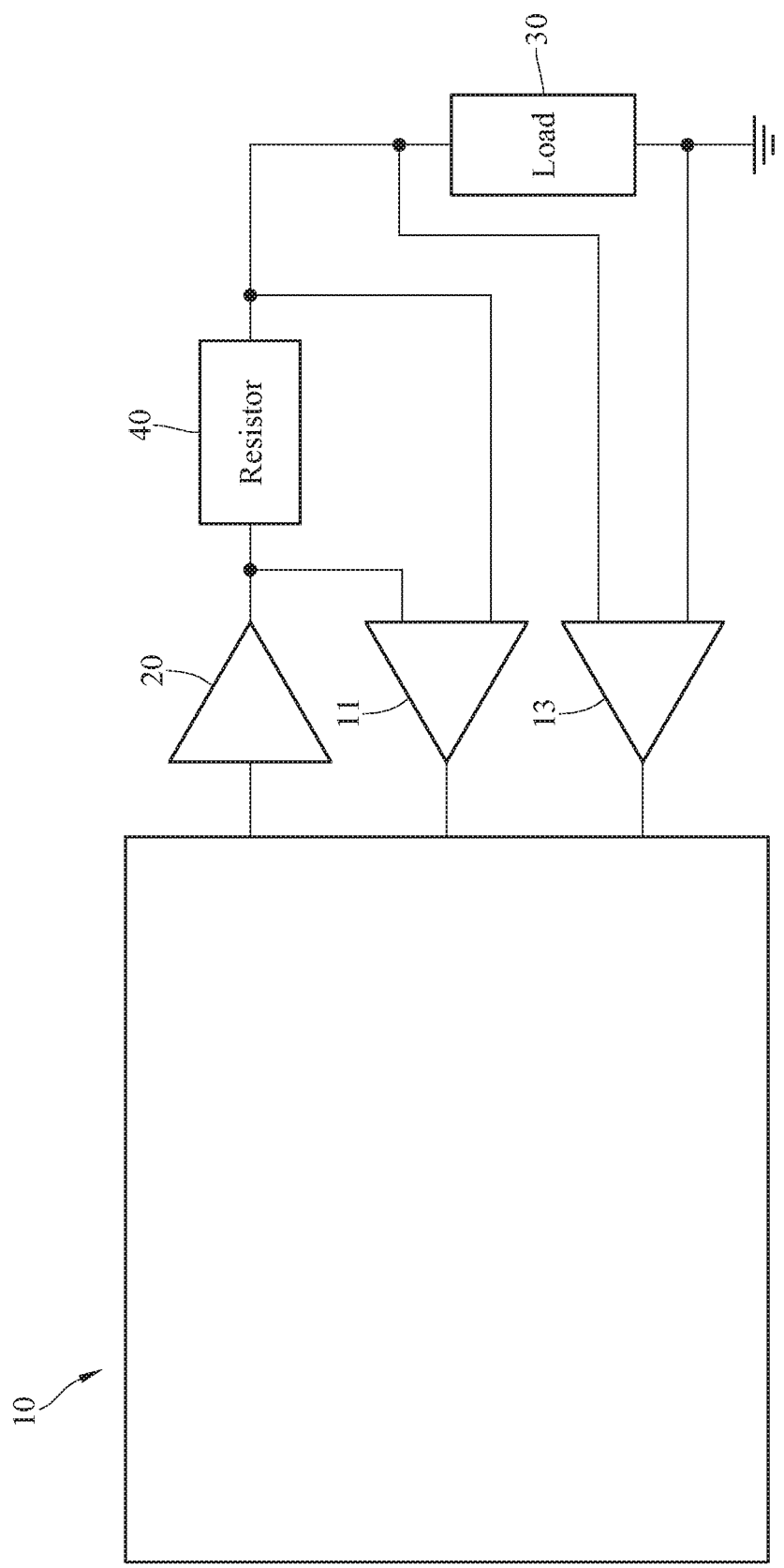
FIG. 1 is a block diagram of a controller, a power amplifier and a load according to an embodiment of the disclosure.

Please refer to FIG. 1. FIG. 1 is a block diagram of a controller, a power amplifier and a load according to an embodiment of the disclosure. As shown in FIG. 1, a controller 10 is electrically connected to a power amplifier 20. The power amplifier 20 outputs a driving signal to a load 30 according to a setting parameter outputted by the controller 10. For example, the controller 10 is a field-programmable gate array (FPGA), a complex programmable logic device (CPLD) or another suitable device.

In an embodiment, the output end of the power amplifier 20 is electrically connected to a resister 40 and the load 30, and the load 30 and the resister 40 are connected in series. The controller 10 includes a first differential amplifier 11 and a second differential amplifier 13. The first input end and second input end of the first differential amplifier 11 are electrically connected to two ends of the resister 40 respectively, and the first differential amplifier 11 forms a current feedback loop together with the power amplifier 20, the load 30 and the resister 40 for detecting the voltage difference between the two ends of the resister 40 and determining the detection current value of a current flowing through the load 30 according to the voltage difference between the two ends of the resister 40 and the resistance of the resister 40. The first input end and second input end of the second differential amplifier 13 are electrically connected to two ends of the load 30 respectively, and the second differential amplifier 13 forms a voltage feedback loop together with the power amplifier 20, the load 30 and the resister 40 for detecting the voltage difference between the two ends of the load 30 and setting this voltage difference as a detection voltage value on the load 30.

The controller 10 operates in either a voltage control mode or a current control mode, and detects the detection current value and detection voltage value of the load 30 at a plurality of detection time points. In the voltage control mode, the controller 10 generates the setting parameter according in part to the detection voltage values. In the current control mode, the controller 10 generates the setting parameter according in part to the detection current values. In other words, at each detection time point, the controller 10 detects the detection current value and detection voltage value of the load 30 while generating a setting parameter according to the detection current value or the detection voltage value.

In a particular example, the controller 10 in the voltage control mode generates a setting parameter according to the detection voltage value obtained at the current detection voltage value and the detection voltage value obtained at the previous detection time point. The controller 10 in the current control mode generates a setting parameter according to the detection current value obtained at the present detection time point and the detection current value obtained at the previous detection time point. In another embodiment, the controller 10 decides a setting parameter for the present detection time point further according to the setting parameter obtained at the previous detection time point. The disclosure is not limited to these examples.

In this embodiment, the controller 10 at each detection time point compares a first ratio with a second ratio and selectively switches to either the voltage control mode or the current control mode according to the comparison result of the first ratio and the second ratio. The first ratio is related to a ratio between a preset current value and the detection current value at the present detection time point, and the second ratio is related to a ratio between a preset voltage value and the detection voltage value at the present detection time point.

In an embodiment, the first ratio is a ratio of the difference between the detection current value and an initial current value to the difference between the preset current value and the initial current value; and the second ratio is a ratio of the difference between the detection voltage value and an initial voltage value to the difference between the preset voltage value and the initial voltage value. In other words, the controller 10 detects variances in the current and voltage on the load 30, and then decides to operate in either the voltage control mode or the current control mode according to the degree of completion of the detection current value arriving the preset current value and the degree of completion of the detection voltage value arriving the preset voltage value. For example, when the first ratio is larger than the second ratio, the controller 10 operates in the current control mode. When the second ratio is larger than the first ratio, the controller 10 operates in the voltage control mode.

When the controller 10 switches from the voltage control mode to the current control mode or from the current control mode to the voltage control mode, the controller 10 determines the ratio between the detection current value and the detection voltage value, and generates a setting parameter according to at least the ratio. That is, when the controller 10 operates in the voltage control mode in an example, the first ratio is larger than the second ratio at a detection time point. At this time, the controller 10 switches to the current control mode, and determines the ratio between the detection current value and the detection voltage value at the detection time point that the comparison result between the first ratio and the second ratio changes. Then, the controller 10, according to this ratio between the detection current value and the detection voltage value, generates a setting parameter. Therefore, when the controller 10 switches to the current control mode, the bandwidth of the current feedback loop is substantially equal to the bandwidth of the voltage feedback loop. In this way, no matter if the controller 10 generates a setting parameter based on either the detection current value of the current feedback loop or the detection voltage value of the voltage feedback loop, the controller 10, as changing its control mode, can use the ratio between the detection voltage value and the detection current value to substantially make the bandwidths of the current feedback loop and voltage feedback loop the same. Therefore, the signal outputted to the load 30 from the controller 10 and the power amplifier 20 may keep harmonious, have no disharmonious output waveform, or have no overshoot, and the reliability of power supply may also increase.

In another embodiment, the controller 10 can directly decide according to the current or voltage on the load 30 to operate in either the voltage control mode or the current control mode. Or, the controller 10 can decide according to the product of the current value and the related bandwidth and the product of the voltage value and the related bandwidth to operate in either the voltage control mode or the current control mode. The disclosure does not intend to limit a basis of such a decision.

Figure 2:
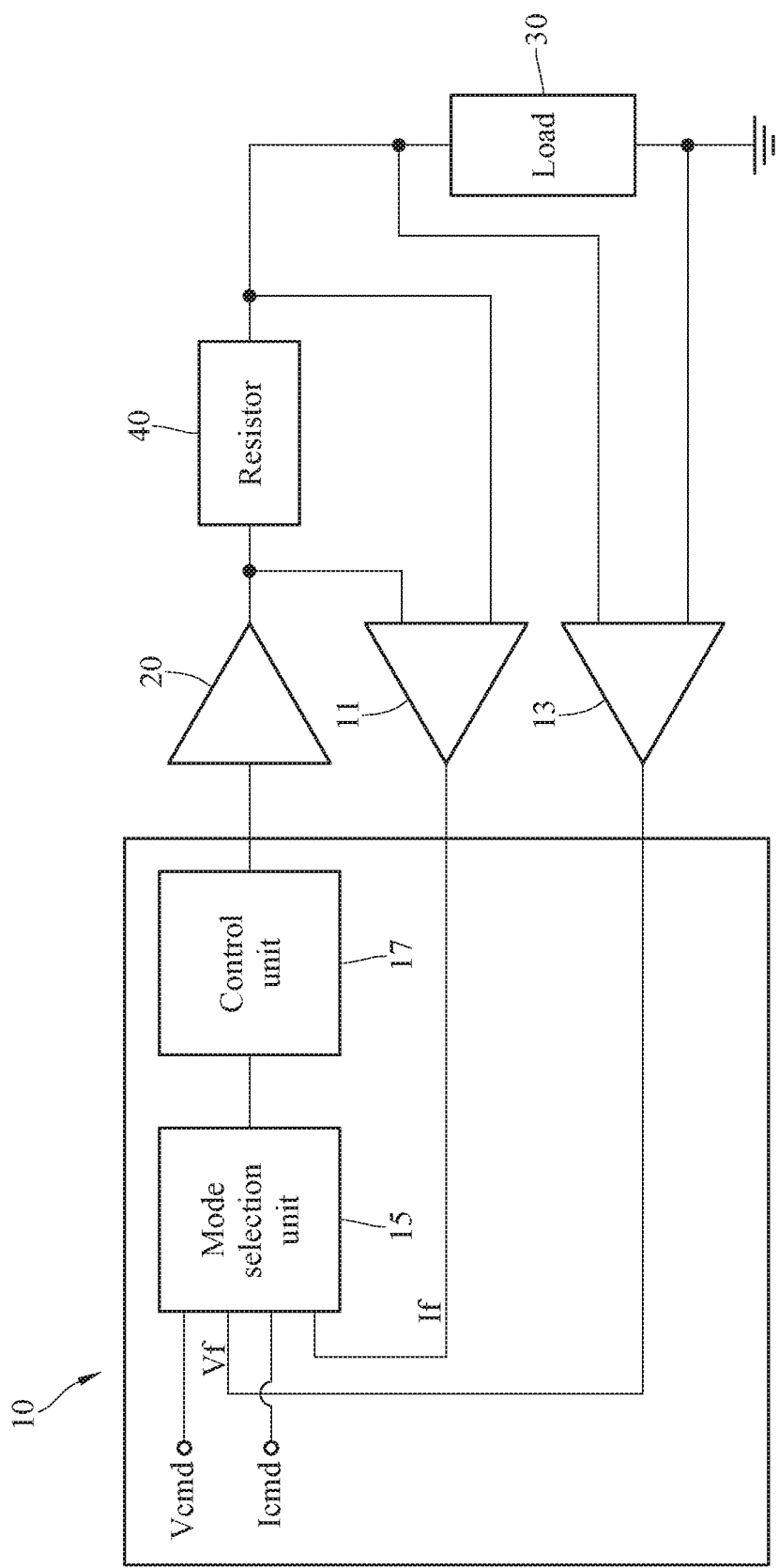
FIG. 2 is a block diagram of a controller, a power amplifier and a load according to another embodiment of the disclosure.

A particular example is taken as follows by referring to FIG. 2. FIG. 2 is a block diagram of a controller, a power amplifier and a load according to another embodiment of the disclosure. In the figure, the controller 10 includes a mode selection unit 15 and a control unit 17. At a plurality of detection time points, the controller 10 detects the detection current value and detection voltage value on the load 30. At the Kth detection time point, the controller 10 detects and obtains the detection current value $If_k$ and the detection voltage value $Vf_k$ on the load 30 and compares the first ratio Iloop with the second ratio Vloop.

The first ratio Iloop and the second ratio Vloop are exemplarily expressed as:

$$Vloop = \frac{(Vf_k - V_{start})}{(Vcmd - V_{start})}; \text{ and}$$

$$Iloop = \frac{(If_k - I_{start})}{(Icmd - I_{start})}.$$

$V_{start}$ represents the initial voltage value on the load 30; $I_{start}$ represents the initial current value on the load 30, Vcmd represents the preset voltage value, and Icmd represents the preset current value. At the Kth detection time point, the second ratio Vloop is larger than the first ratio Iloop, so the controller 10 operates in the voltage control mode to generate a setting parameter $Y_k$ according to the detection voltage value $Vf_k$ at the Kth detection time point, the detection voltage value $Vf_{k-1}$ obtained at the (K−1)th detection time point and the setting parameter $Y_{k-1}$ obtained at the (K−1)th detection time point.

$$Y_k = Y_{k-1} + \left(\frac{T \times KI_V}{2}\right)(Vf_k + Vf_{k-1})$$

T represents the time difference between two adjacent detection time points, and $KI_v$ represents the gain of the mode selection unit 15 in the voltage control mode. The power amplifier 20 receives the setting parameter $Y_k$ from the controller 10 and outputs a driving signal to the load 30 according to the setting parameter $Y_k$. Here, the bandwidth $GBW_v$ of the voltage feedback loop is expressed as:

$$GBW_V = KI_V G_{Amp} \frac{V_{RL}}{V_{RS} + V_{RL}} \beta_V.$$

$G_{AMP}$ represents the gain of the power amplifier 20, $V_{RL}$ represents the voltage difference between the two ends of the load 30, $V_{RS}$ represents the voltage difference between the two ends of the resister 40, and βv represents the gain of the second differential amplifier 13. The controller 10 at each detection time point in the voltage control mode generates a setting parameter according to the setting parameter and the detection voltage value at the previous detection time point and the detection voltage value at the present detection time point. In other words, when the controller 10 sets the voltage feedback loop as a main control loop, the controller 10 sets the detection voltage value detected from the voltage feedback loop to be a setting parameter and provides this setting parameter to the power amplifier 20. Therefore, the detection voltage value on the load 30 gets close to the preset voltage value.

At the (K+1)th detection time point, the first ratio Iloop is larger than the second ratio Vloop, so the controller 10 switches to the current control mode. At this time, it is designed that the bandwidth GBWv of the voltage feedback loop is substantially equal to the bandwidth $GBW_I$ of the current feedback loop for making the output signals of the controller 10 and the power amplifier 20 unbroken.

$$GBW_I = KI_I G_{Amp} \frac{V_{RS}}{V_{RS} + V_{RL}} \beta_I$$

$KI_I$ represents the gain of the mode selection unit 15 in the current control mode, and $\beta_I$ represents the gain of the first differential amplifier 11. When the bandwidth GBWv of the voltage feedback loop is substantially equal to the bandwidth GBWI of the current feedback loop, the controller 10 determines a ratio between the detection current value $If_{k+1}$ and the detection voltage value $Vf_{k+1}$ at the (K+1)th detection time point, and then obtains a ratio between the gain of the mode selection unit 15 in the current control mode and the gain of the mode selection unit 15 in the current control mode according to the ratio between the detection current value $If_{k+1}$ and the detection voltage value $Vf_{k+1}$ at the (K+1)th detection time point:

$$GBW_I = GBW_V \Rightarrow KI_I \cdot If_{k+1} = KI_V \cdot Vf_{k+1}.$$

The controller 10 then generates a setting parameter $Y_{k+1}$ according to the ratio of the gains of the mode selection unit 15 in the current control mode and the current control mode, the detection voltage value $Vf_k$ and the detection current value $If_k$ obtained at the Kth detection time point, the detection voltage value $Vf_{k+1}$ and the detection current value $If_{k+1}$ obtained at the (K+1)th detection time point, and the setting parameter $Y_k$, generated at the Kth detection time point.

$$Y_{k+1} = Y_k + \left(\frac{T \times KI_V}{2}\right)(Vf_{k+1} + Vf_k) - \left(\frac{T \times KI_I}{2}\right)(If_{k+1} + If_k)$$

In other words, when the controller 10 switches from a control mode to another control mode and has generated the setting parameter $Y_{k+1}$ according to the ratio between the detection current value $If_{k+1}$ and the detection voltage value $Vf_{k+1}$, the bandwidth of the current feedback loop is substantially equal to the bandwidth of the voltage feedback loop. Therefore, the output voltage or current of the controller 10 may not have a disharmonious variation waveform when the control mode of the controller 10 changes and the overshoot of the voltage or current can be avoided.

At the next detection time point after the controller 10 switches to the current control mode, namely the (K+2)th detection time point, the controller 10 in the current control mode generates a setting parameter $Y_{k+2}$ according to the detection current value $If_{k+2}$ obtained at the (K+2)th detection time point, the detection current value $If_{k+1}$ obtained at the (K+1)th detection time point, and the setting parameter $Y_{k+1}$ obtained at the (K+1)th detection time point.

$$Y_{k+2} = Y_{k+1} + \left(\frac{T \times KI_I}{2}\right)(If_{k+1} + If_{k+2})$$

In the aforementioned embodiment, $KI_I$ and $KI_V$ respectively represent the gain of the mode selection unit 15 in the current control mode and the gain of the mode selection unit 15 in the current control mode; and the control unit 17 is configured to receive from the mode selection unit 15 the detection current value and the detection voltage value obtained at each detection time point, and is also configured to according to the control mode determined by the mode selection unit 15, generate a present setting parameter by the gain $KI_I$ or $KI_V$, the time difference T, or the setting parameter, detection current value or detection voltage value obtained at the previous detection time point. However, the disclosure is not limited to the aforementioned embodiment. One of ordinary skill in the art can design the operations and functions of the mode selection unit 15 and the control unit 17 according to particular requirements, and this embodiment does not intend to limit them.

For convenience, in the aforementioned embodiment, when it is determined at the (K+1)th detection time point that the first ratio Iloop is larger than the second ratio Vloop, the controller 10 would generate the setting parameter $Y_{k+1}$ according to the ratio between the detection current value $If_{k+1}$ and the detection voltage value $Vf_{k+1}$. In another embodiment, when it is determined at the (K+1)th detection time point that the first ratio Iloop is larger than the second ratio Vloop, the controller 10 still operates in the voltage control mode to generate the setting parameter $Y_{k+1}$ by the setting parameter $Y_k$ and the detection voltage value $Vf_k$ obtained at the Kth detection time point and the detection voltage value $Vf_{k+1}$ obtained at the (K+1)th detection time point. At the next detection time point, i.e. the (K+2)th detection time point, the controller 10 switches to another control mode to generate the setting parameter $Y_{k+2}$ according to the ratio between the detection current value $If_{k+2}$ and the detection voltage value $Vf_{k+2}$. At the (K+3)th detection time point, the controller 10 operates in the current control mode to generate the setting parameter $Y_{k+3}$ by the setting parameter $Y_{k+2}$ and the detection current value $If_{k+2}$ obtained at the (K+2)th detection time point and the detection current value $If_{k+3}$ obtained at the (K+3)th detection time point.

Figure 3:
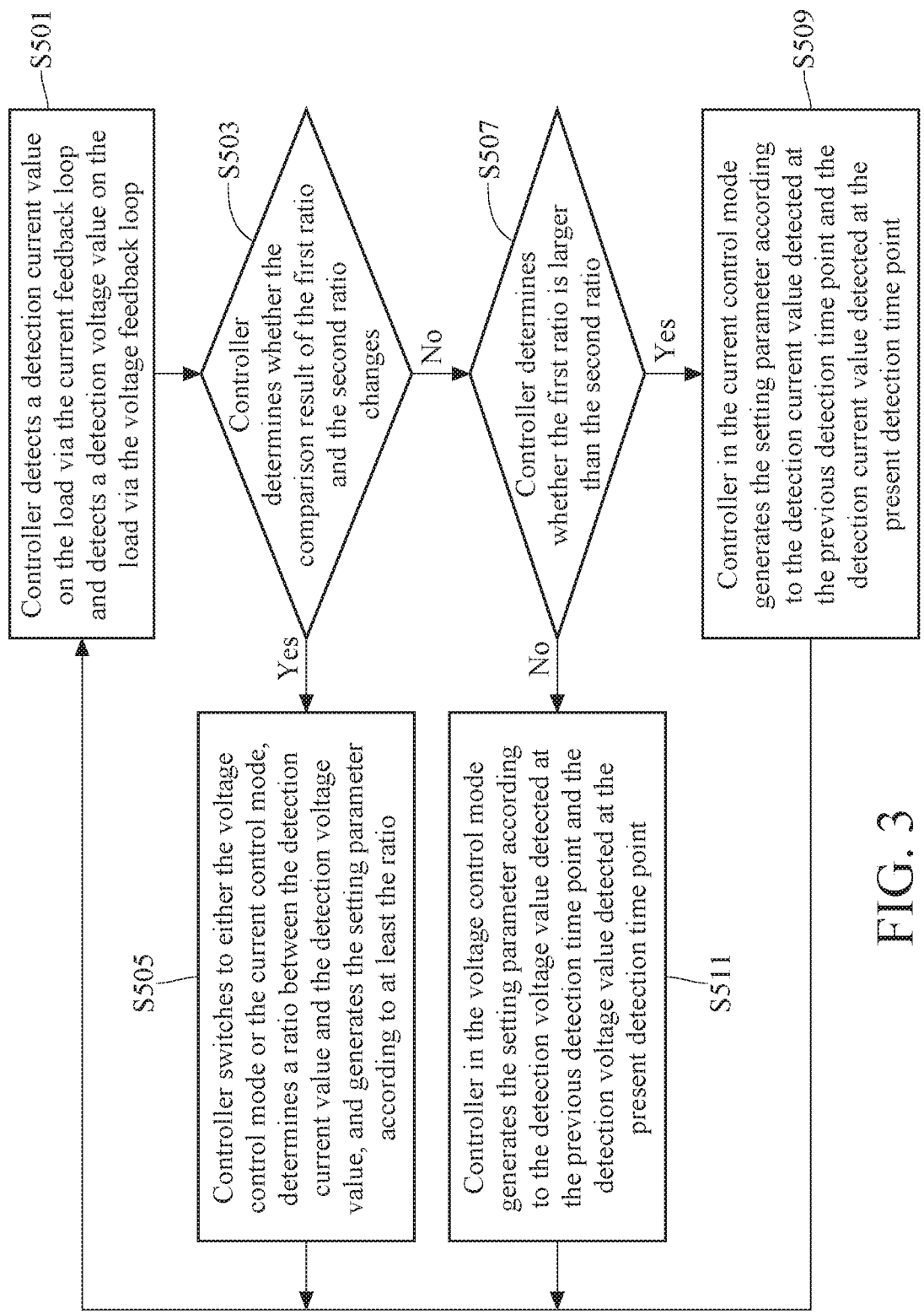
FIG. 3 is a flow chart of an output control method according to an embodiment.

To clarify the output control method for the controller 10, please refer to FIG. 1 and FIG. 3 to illustrate the steps in the output control method according to an embodiment. As shown in the drawings, at a detection time point, the controller 10 performs step S501 for detecting the detection current value on the load 30 via the current feedback loop and detecting the detection voltage value on the load 30 via the voltage feedback loop. The controller 10 performs step S503 for determining whether the comparison result of the first ratio and the second ratio changes. The first ratio is related to a ratio between the detection current value and the preset current value at the present detection time point, and the second ratio is related to a ratio between the detection voltage value and the preset voltage value at the present detection time point.

When the comparison result of the first ratio and the second ratio changes, the controller 10 performs step S505 for switching to either the voltage control mode or the current control mode, determining a ratio between the detection current value and the detection voltage value, and generating a setting parameter according to at least the ratio. When the comparison result of the first ratio and the second ratio do not change, the controller 10 performs step S507 for determining whether the first ratio is larger than the second ratio. When the first ratio is larger than the second ratio, the controller 10 performs step S509 for operating in the current control mode, and generating a setting parameter according to the detection current value detected at the previous detection time point and the detection current value detected at the present detection time point. When the first ratio is not larger than the second ratio, the controller 10 performs step S511 for operating in the voltage control mode, and generating a setting parameter according to the detection voltage value detected at the previous detection time point and the detection voltage value detected at the present detection time point.

After the controller 10 performs steps S501 to S511 at this detection time point, the controller 10 returns to step S501 at the next detection time point for performing steps S501 to S511 again. In this embodiment, when the comparison result of the first ratio and the second ratio changes, the controller 10 generates a setting parameter according to the ratio between the detection current value and the detection voltage value; and thus, when the controller 10 switches from a control mode to another control mode, the bandwidths of the current feedback loop and the voltage feedback loop are substantially the same. In this way, the signals outputted to the load 30 respectively from the controller 10 and the power amplifier 20 may keep harmonious and not have disharmonious waveforms or overshoot, and then the controller 10 and the power amplifier 20 could provide a driving signal with better reliability.

As set forth above, embodiments of the disclosure provide an output control method for controllers. In the method, by detecting the detection current value of the current feedback loop and the detection voltage value of the voltage feedback loop at each detection time point, the controller generates a setting parameter according to the ratio between the detection current value and the detection voltage value as changing the control mode. The power amplifier is controlled by the setting parameter so that the bandwidth may be substantially equalized in the current feedback loop and the voltage feedback loop as the controller changes its control mode. Therefore, the output voltage or output current of the controller may have no disharmonious variation waveform and no overshoot, and then the controller and the power amplifier are capable of together providing a driving signal with better reliability to a load.

What is claimed is:

1. An output control method for a digital controller of a source measure unit that is electrically connected to a load via a voltage feedback loop and a current feedback loop and is configured to output a setting parameter to a power amplifier configured to provide a driving signal to the load according to the setting parameter, the output control method comprising:
at each of a plurality of detection time points, detecting a detection current value on the load by the current feedback loop and detecting a detection voltage value on the load by the voltage feedback loop;
in a voltage control mode, generating the setting parameter according in part to the detection voltage values;
in a current control mode, generating the setting parameter according in part to the detection current values; and
at one of the plurality of detection time points by the digital controller, determining a ratio between the detection current value and the detection voltage value and generating, according to at least the ratio, the setting parameter for substantially equalizing bandwidth in the voltage feedback loop and the current feedback loop when the digital controller switches from the voltage control mode to the current control mode or from the current control mode to the voltage control mode.

2. The output control method according to claim 1, further comprising:
comparing a first ratio with a second ratio at each of the plurality of detection time points, wherein the first ratio is related to a preset current value and the detection current value at the detection time point, and the second ratio is related to a preset voltage value and the detection voltage value at the detection time point; and
selectively switching to either the voltage control mode or the current control mode according to comparison result of the first ratio and the second ratio.

3. The output control method according to claim 2, wherein when the first ratio is larger than the second ratio, the digital controller operates in the current control mode; and when the second ratio is larger than the first ratio, the digital controller operates in the voltage control mode.

4. The output control method according to claim 3, wherein when the digital controller switches from the voltage control mode to the current control mode or from the current control mode to the voltage control mode, the digital controller generates the setting parameter according to the ratio between the detection current value and the detection voltage value at the detection time point that the comparison result of the first ratio and the second ratio changes.

5. The output control method according to claim 4, wherein the setting parameter is generated further according to the detection current value and the detection voltage value at the detection time point that the comparison result of the first ratio and the second ratio changes, and the detection current value and the detection voltage value at the previous detection time point.

6. The output control method according to claim 5, wherein generating the setting parameter according in part to the detection voltage values comprises:
generating, at each of the plurality of detection time points, the setting parameter according to the detection voltage value at the detection time point and the detection voltage value at the previous detection time point.

7. The output control method according to claim 6, wherein generating the setting parameter according in part to the detection current values comprises:
generating, at each of the plurality of detection time points, the setting parameter according to the detection current value at the detection time point and the detection current value at the previous detection time point.

8. The output control method according to claim 7, wherein generating the setting parameter at each of the plurality of detection time points comprises:
generating the setting parameter at the present detection time point further according to the setting parameter at the previous detection time point.

* * * * *